US010982576B2

(12) United States Patent
Oso et al.

(10) Patent No.: US 10,982,576 B2
(45) Date of Patent: Apr. 20, 2021

(54) ENGINE THAT INCLUDES BLOW-BY-GAS RETURNING SYSTEM

(71) Applicant: KUBOTA Corporation, Osaka (JP)

(72) Inventors: Hiroki Oso, Sakai (JP); Akira Tanaka, Sakai (JP); Hideyuki Koyama, Sakai (JP); Rina Kaneko, Sakai (JP); Nobuyoshi Okada, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/410,280

(22) Filed: May 13, 2019

(65) Prior Publication Data

US 2019/0345855 A1 Nov. 14, 2019

(30) Foreign Application Priority Data

May 14, 2018 (JP) .............................. JP2018-093008
May 14, 2018 (JP) .............................. JP2018-093010

(51) Int. Cl.
*F01M 13/04* (2006.01)
*F02M 35/04* (2006.01)
*F02M 35/10* (2006.01)

(52) U.S. Cl.
CPC .......... *F01M 13/04* (2013.01); *F02M 35/044* (2013.01); *F02M 35/10157* (2013.01); *F02M 35/10222* (2013.01)

(58) Field of Classification Search
CPC ............... F01M 13/04; F01M 13/0416; F01M 2013/0494; F01M 2013/0488
See application file for complete search history.

(56) References Cited

U.S. PATENT DOCUMENTS

| 6,009,863 A | 1/2000 | Tochizawa | |
|---|---|---|---|
| 2007/0251512 A1* | 11/2007 | Wallington | .......... F02M 35/024 123/572 |
| 2008/0196364 A1* | 8/2008 | Brand | .................... B01D 45/06 55/290 |
| 2014/0076294 A1* | 3/2014 | Ulrey | ................... F01M 13/022 123/572 |

(Continued)

FOREIGN PATENT DOCUMENTS

DE 102016211158 A1 1/2017
EP 0448431 A1 9/1991
(Continued)

OTHER PUBLICATIONS

Kollmann et al., "Die neuen vierventil-ottomotoren fuer die mittlere baureihe von mercedes-Benz", Mtz-Motortechnische Zeitschrift, Springer Verlag, vol. 53, No. 10, Oct. 1992, p. 430-442.
(Continued)

*Primary Examiner* — Long T Tran
(74) *Attorney, Agent, or Firm* — Panitch Schwarze Belisario & Nadel LLP

(57) ABSTRACT

In an engine that includes a blow-by-gas returning system configured to direct blow-by gas within a crankcase to an intake system through an inside of a head cover, the intake system includes a cover intake-passage disposed at a blow-by-gas outlet of the head cover, and the cover intake-passage communicates with a blow-by-gas passage of the blow-by-gas outlet.

16 Claims, 15 Drawing Sheets

(56) References Cited

U.S. PATENT DOCUMENTS

| | | | | |
|---|---|---|---|---|
| 2014/0345580 | A1* | 11/2014 | Gao | F01M 13/04 |
| | | | | 123/572 |
| 2016/0177791 | A1* | 6/2016 | Kira | F01M 13/0416 |
| | | | | 123/573 |
| 2016/0265404 | A1* | 9/2016 | Fujii | F01M 13/0416 |
| 2016/0376950 | A1* | 12/2016 | Kira | F01M 13/04 |
| | | | | 123/573 |
| 2018/0010497 | A1* | 1/2018 | Dwivedi | F01M 13/022 |
| 2018/0017420 | A1* | 1/2018 | Wotruba | G01N 29/4436 |
| 2018/0216508 | A1* | 8/2018 | Brinker | F16K 15/16 |

FOREIGN PATENT DOCUMENTS

| | | |
|---|---|---|
| EP | 0463267 A1 | 1/1992 |
| JP | 2000352362 A | 12/2000 |
| JP | 2008163837 A | 7/2008 |
| WO | 2017187872 A1 | 11/2017 |

OTHER PUBLICATIONS

Extended European Search Report dated Oct. 4, 2019 in EP Application No. 19171581.2.

* cited by examiner

ENGINE THAT INCLUDES BLOW-BY-GAS RETURNING SYSTEM

CROSS-REFERENCE TO RELATED APPLICATIONS

This application claims priority under 35 U.S.C. § 119(b) to Japanese Patent Application No. 2018-093008, filed May 14, 2018, and Japanese Patent Application No. 2018-093010, filed May 14, 2018, the disclosures of which are incorporated herein by reference in their entirety.

BACKGROUND OF THE INVENTION

(1) Field of the Invention

The present invention relates to an engine that includes a blow-by-gas returning system.

(2) Description of Related Art

An engine includes a blow-by-gas returning system not to directly release blow-by gas that stays within a crankcase to the air. The blow-by-gas returning system returns blow-by gas that stays within a crankcase to an intake system, such as an intake passage. The blow-by gas that has returned to the intake system is mixed with new fuel-air mixture and burned. It is desirable to remove as much liquid components, such as oil (oil mist) and water, contained in blow-by gas, as possible before the blow-by gas is returned to an intake passage of an engine that includes a blow-by-gas returning system.

Therefore, in many conventional engines, blow-by gas is returned to an intake system through a cylinder head and a head cover from a crankcase to allow liquid components to be easily collected within the engines.

SUMMARY OF THE INVENTION

Since a pipe that returns blow-by gas to an intake system is generally disposed outside an engine, the pipe is likely to be affected by coldness. Blow-by gas that has returned to an intake passage is cooled by new air at the intake passage at very low temperatures. Consequently, moisture in the cooled blow-by gas freezes at an outlet of the pipe. The frozen moisture may clog the outlet of the pipe.

An object of the present invention is to provide an improved engine that includes a blow-by-gas returning system configured to direct blow-by gas within a crankcase to an intake system through an inside of a head cover. An inventive structure allows moisture in blow-by gas to be less likely to freeze at a terminating end of a blow-by-gas passage where the blow-by-gas passage communicates with the intake system. Therefore, the above inconvenience due to freezing at low temperatures is reduced as little as possible in the improved engine that includes a blow-by-gas returning system.

An aspect of the present invention is characterized by a fact that a cover intake-passage that forms part of an intake system that supplies air to an intake manifold is integral with a head cover, and a fact that a blow-by-gas passage of the head cover communicates with the cover intake-passage.

More specifically, part of compressor upstream suction passage that connects an air cleaner with a supercharger and a blow-by-gas outlet of the head cover are integrally formed so as to make the cover intake-passage. Blow-by gas returns to the integral cover intake-passage.

A second aspect of the present invention is characterized by a fact that a cover intake-passage that forms part of an intake system that supplies air to an intake manifold is integral with a head cover, and a blow-by-gas passage of the head cover communicates with the cover intake-passage, and a fact that a bottom wall of the blow-by-gas passage includes a return hole through which collected oil drops, and a descending slope that is around the return hole and becomes lower toward the return hole. For example, a blow-by-gas outlet is under the cover intake-passage of the head cover, and the bottom wall of the blow-by-gas outlet includes the return hole and the descending slope.

The head cover receives heat from a cylinder head and thus becomes hot. According to an aspect of the present invention, blow-by gas returns to the cover intake-passage that forms part of the head cover that becomes hot. Therefore, even if sucked air is cold due to very low temperatures, for example, a temperature of the air rises while the air flows through the cover intake-passage. Therefore, moisture in blow-by gas that returns to the intake system, such as the compressor upstream suction passage, does not freeze or is less likely to freeze.

Consequently, an inventive structure allows moisture in blow-by gas to be less likely to freeze at a terminating end of the blow-by-gas passage where the blow-by-gas passage communicates with the intake system. Therefore, an improved engine that includes a blow-by-gas returning system that reduces the above inconvenience due to freezing at low temperatures as little as possible is provided.

The head cover receives heat from the cylinder head and thus becomes hot. According to a second aspect of the present invention, blow-by gas returns to the cover intake-passage that forms part of the head cover that becomes hot. Therefore, even if sucked air is cold due to very low temperatures, for example, a temperature of the air rises while the air flows through the cover intake-passage. Therefore, moisture in blow-by gas that returns to an intermediate passage does not freeze or is less likely to freeze.

Further, a bottom wall of the blow-by-gas passage includes a return hole, and a descending slope that becomes lower toward the return hole. Therefore, oil naturally flows by gravity even if the engine slightly tilts. Further, the descending slope improves an effect that attracts collected oil to the return hole.

Consequently, an inventive structure allows moisture in blow-by gas to be less likely to freeze at a terminating end of the blow-by-gas passage where the blow-by-gas passage communicates with the intake system. Therefore, an improved engine that includes a blow-by-gas returning system that reduces the above inconvenience due to freezing at low temperatures as little as possible is provided. Further, oil in blow-by gas returns well through the return hole into the improved engine that includes a blow-by-gas returning system, even if the improved engine slightly tilts.

BRIEF DESCRIPTION OF THE DRAWINGS

FIG. 12A is a lateral cross-sectional view, and FIG. 12B is a front-to-rear-directional cross-sectional view of a main part;

DETAILED DESCRIPTION OF PREFERRED EMBODIMENTS

Figure 1:
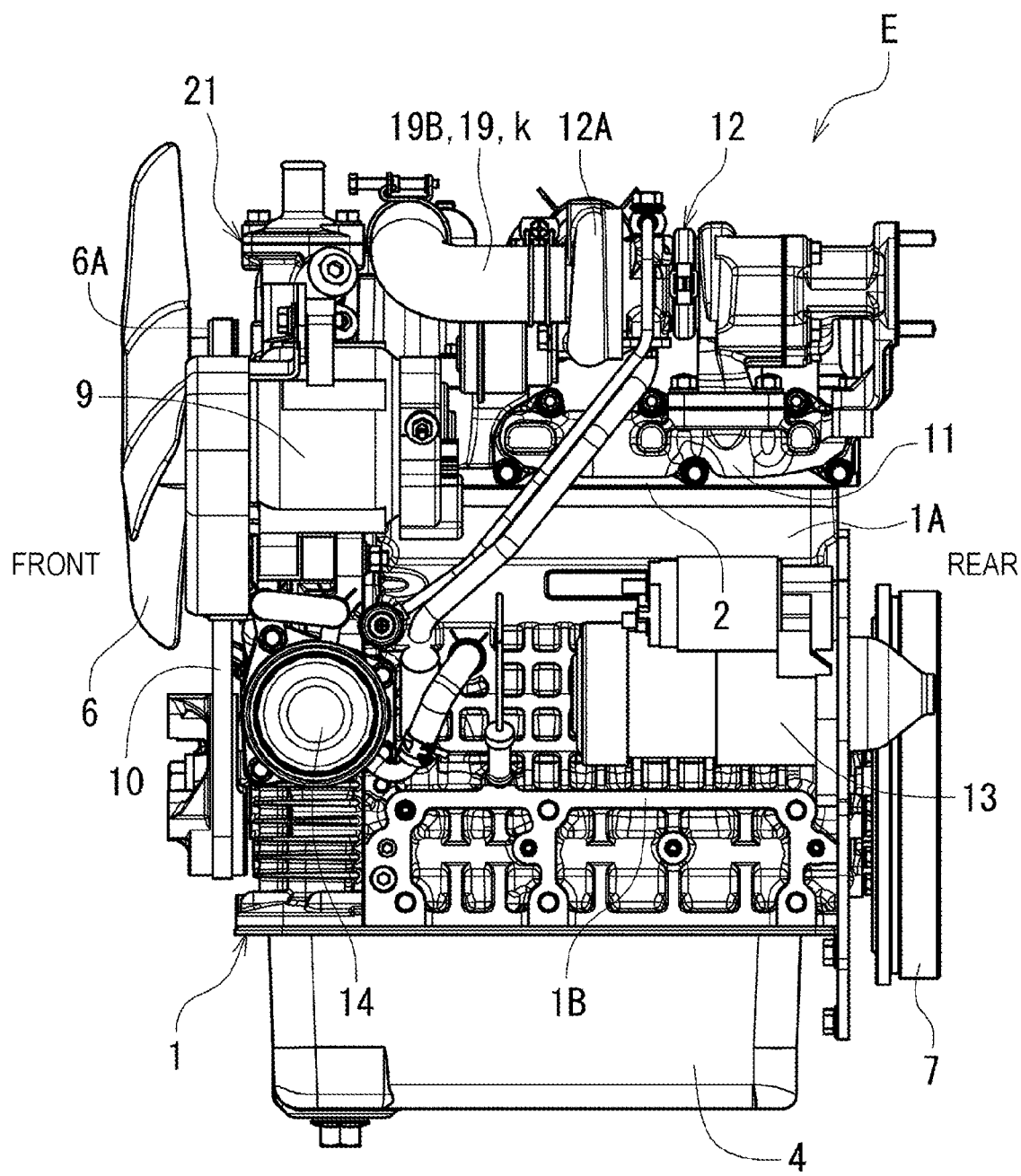
FIG. 1 is a left side view of an industrial diesel engine.
Figure 2:
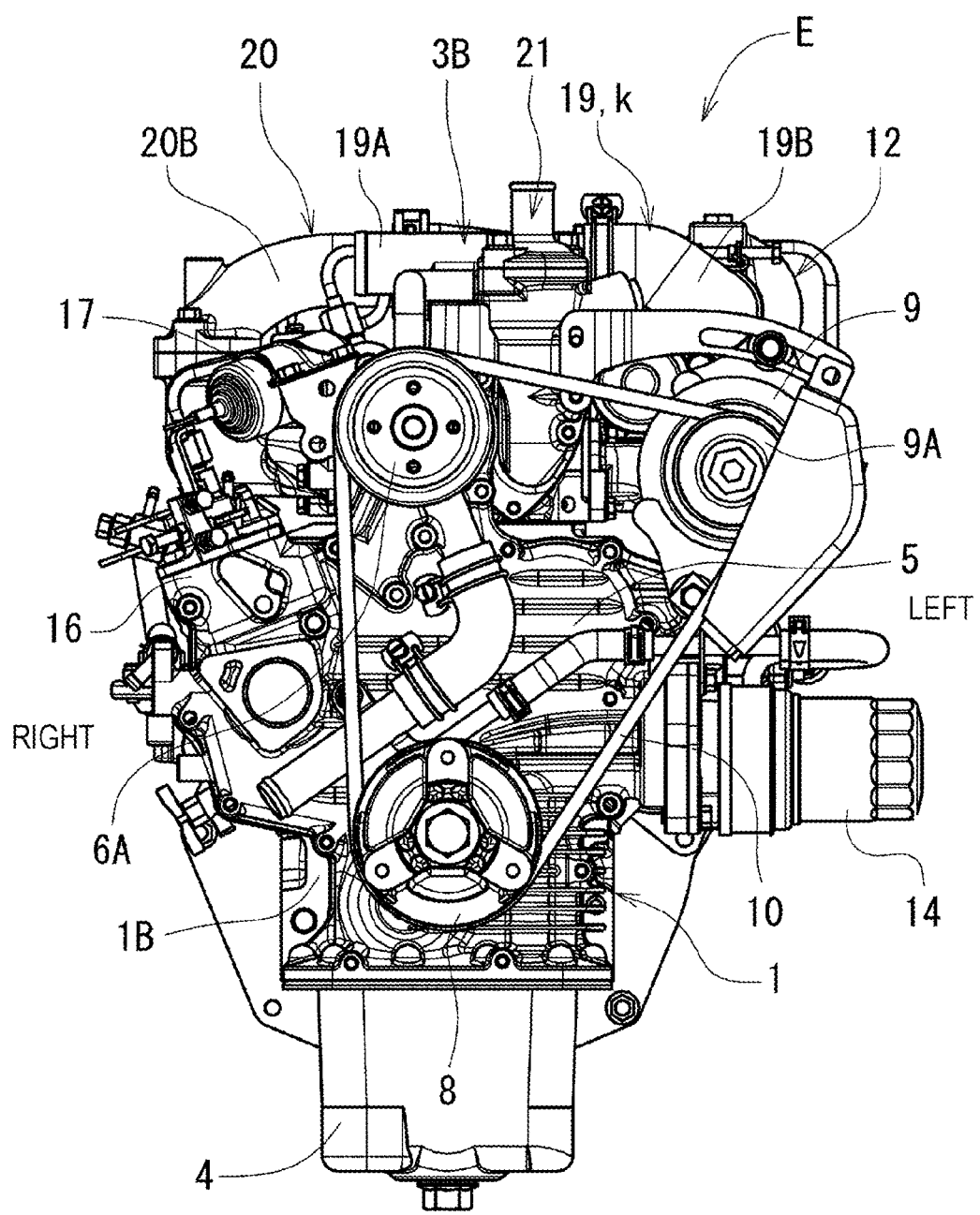
FIG. 2 is a front view of the engine shown in FIG. 1.
Figure 3:
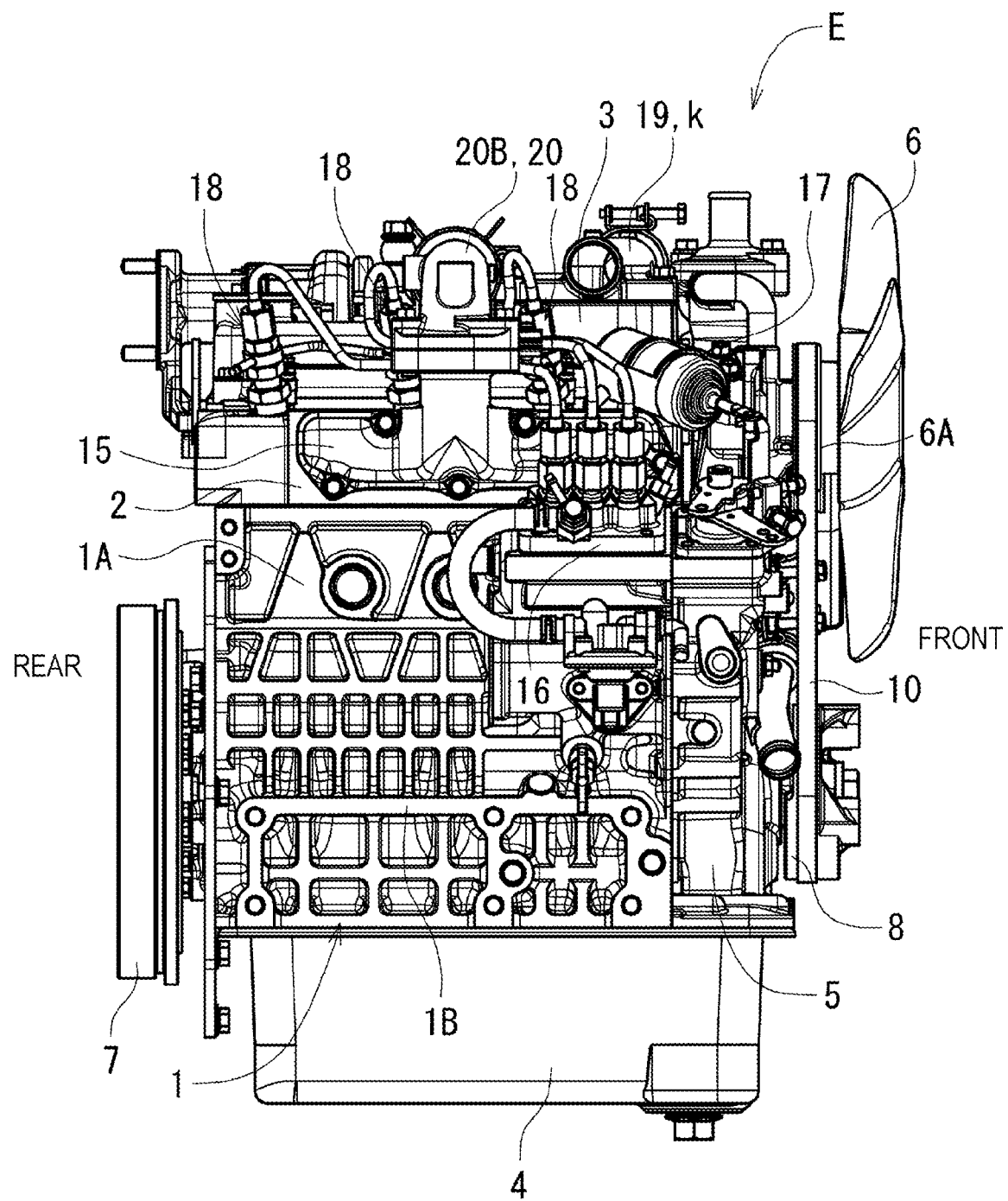
FIG. 3 is a right side view of the engine shown in FIG. 1.

Hereinafter, an engine that includes a blow-by-gas returning system according to a preferred embodiment of the present invention will be described with reference to the drawings. In the preferred embodiment, the engine is applied to an industrial diesel engine.

As illustrated in FIGS. 1 to 5, an industrial diesel engine (hereinafter simply referred to as the engine) E includes a cylinder block 1, a cylinder head 2 attached to a top of the cylinder block 1, a head cover 3 attached to a top of the cylinder head 2, and an oil pan 4 attached to a bottom of the cylinder block 1. A power transmitting case 5 is attached to a front end of the cylinder block 1. An engine cooling fan 6 is disposed in front of the power transmitting case 5. A flywheel 7 is disposed behind the cylinder block 1. An upper half of the cylinder block 1 forms cylinders 1A. A lower half of the cylinder block 1 forms a crankcase 1B.

For example, a power transmitting belt 10 and a water flange 21 are disposed at a front of the engine E. The power transmitting belt 10 extends around a driving pulley 8 attached to an end of a crankshaft (not shown), a fan pulley 6A that drives the engine cooling fan 6, and a driven pulley 9A of a dynamo (alternator) 9. For example, an exhaust manifold 11, a supercharger 12, a starter 13, and an oil filter 14 are disposed at a left side of the engine E. For example, an intake manifold 15, a fuel-injection-pump housing 16, and a stop solenoid 17 are disposed at a right side of the engine E. For example, three injectors 18, a compressor upstream suction passage 19, and a compressor downstream suction passage 20 are disposed at a top of the engine E.

Figure 4:
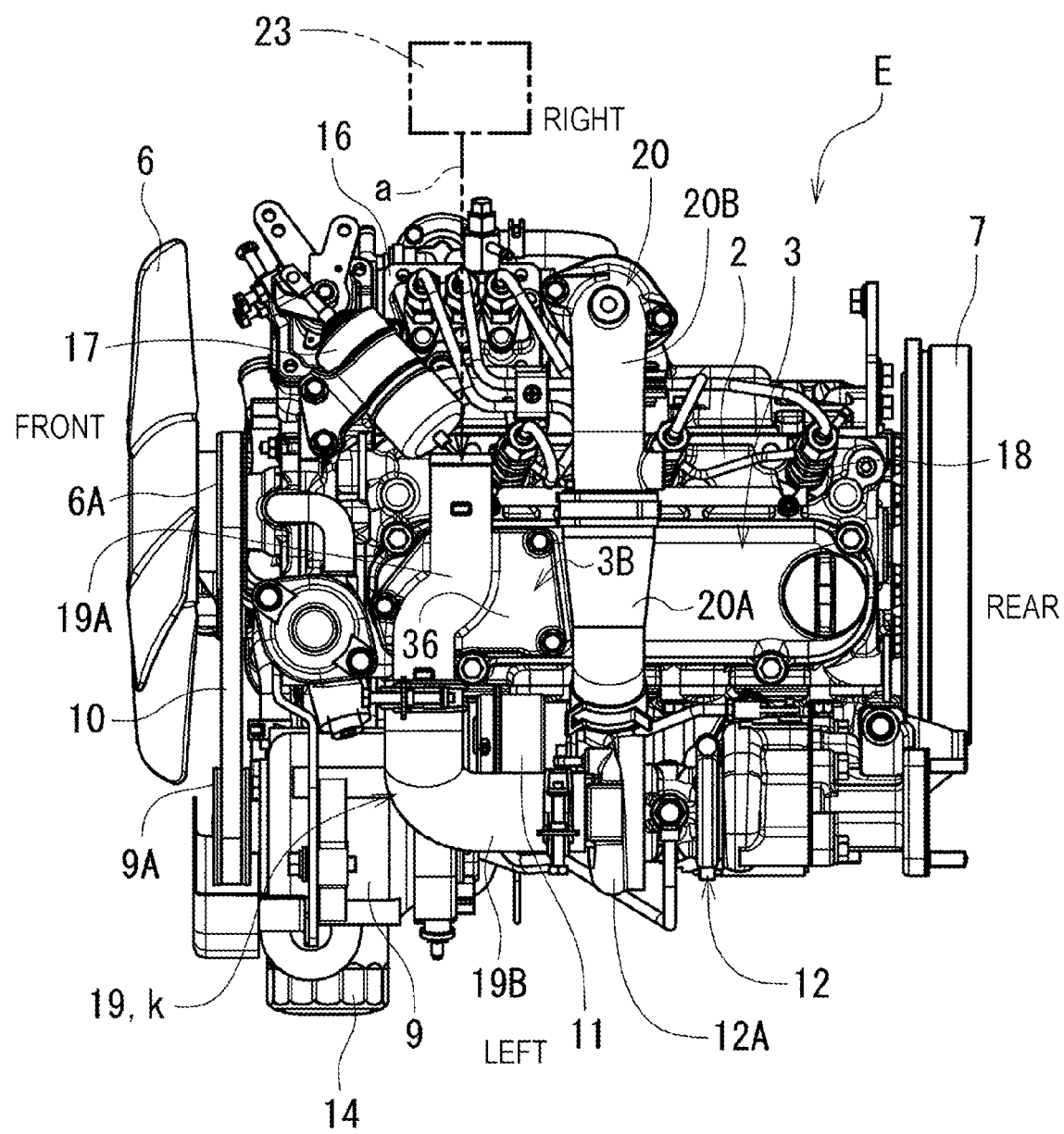
FIG. 4 is a plan view of the engine shown in FIG. 1.
Figure 5:
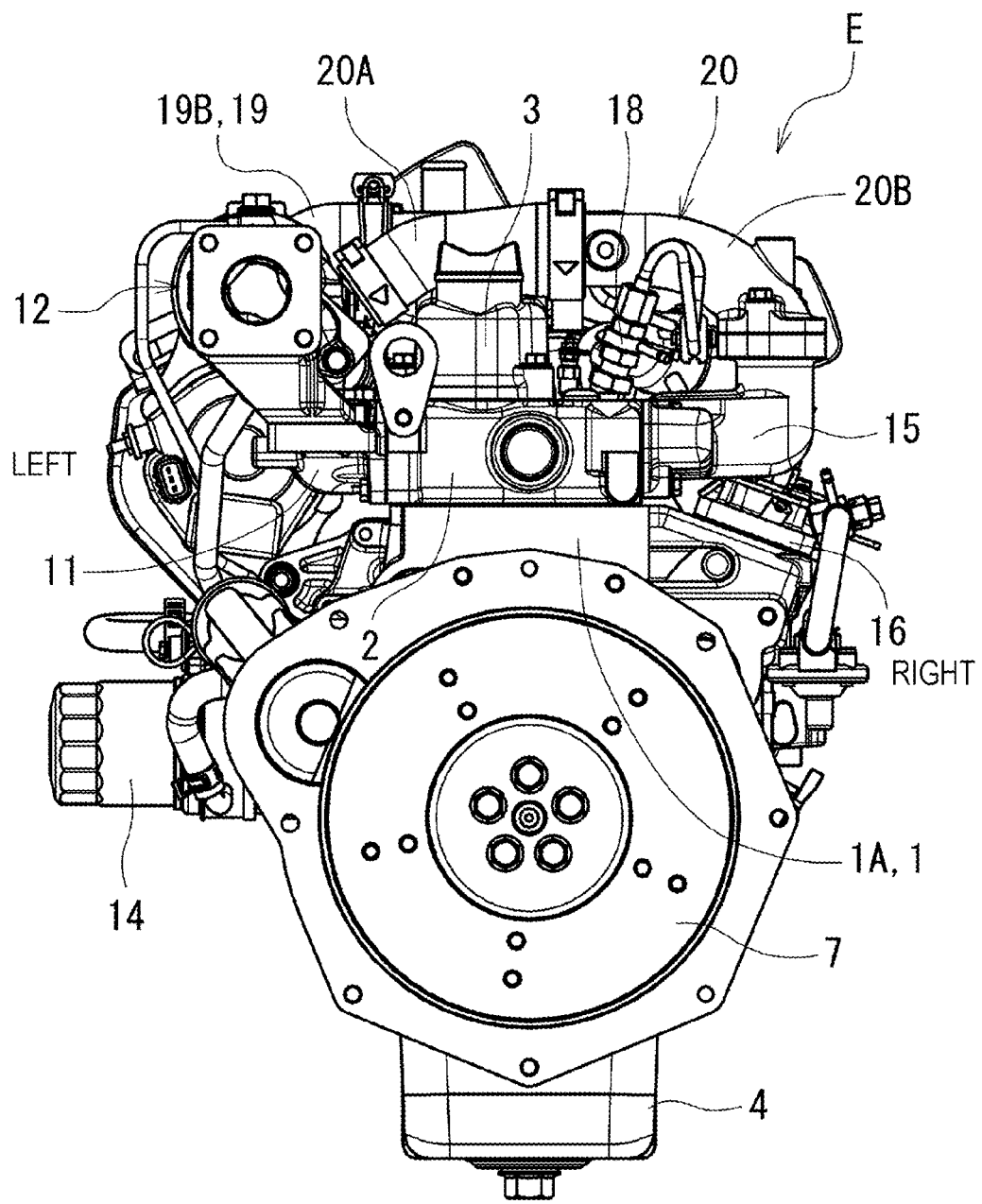
FIG. 5 is a rear view of the engine shown in FIG. 1.

The compressor downstream suction passage 20 includes a leading-end-side pipe 20A connected to a compressor housing 12A and disposed over and across the head cover 3, and a terminating-end-side pipe 20B that connects the leading-end-side pipe 20A with the intake manifold 15. As illustrated in FIG. 4, the leading-end-side pipe 20A is disposed behind and along a cover intake-passage 19A in a plan view. An elbow pipe 19B, the leading-end-side pipe 20A, and the terminating-end-side pipe 20B may be made from a flexible material such as rubber, or metal.

As illustrated in FIGS. 4, 6, 7, and 10, the engine E includes a blow-by-gas returning system A configured to direct blow-by gas within the crankcase 1B to an intake system k through an inside of the head cover 3. The head cover 3 is over a valve actuator B and is attached to the cylinder head 2. The head cover 3 has a shape like a box that has no bottom (lid-like shape). The head cover 3 includes a plurality of ribs 3a within the head cover 3. The plurality of ribs 3a laterally extend. A hole 22 used to replenish engine oil is disposed in a rear portion of the head cover 3.

The intake system k includes the cover intake-passage 19A disposed at a blow-by-gas outlet 3A of the head cover 3. The cover intake-passage 19A communicates with a blow-by-gas passage 26 of the blow-by-gas outlet 3A. The cover intake-passage 19A forms part of the compressor upstream suction passage (an example of a suction passage) 19 that connects an air cleaner 23 (see FIGS. 4 and 6) with the supercharger 12. That is, the compressor upstream suction passage 19 includes the cover intake-passage 19A, and the elbow pipe 19B that connects the cover intake-passage 19A with the compressor housing 12A of the supercharger 12. The intake system k is thought to include all passages that convey air a to a combustion chamber (not shown). The all passages include the air cleaner 23 and the intake manifold 15, for example.

Figure 6:
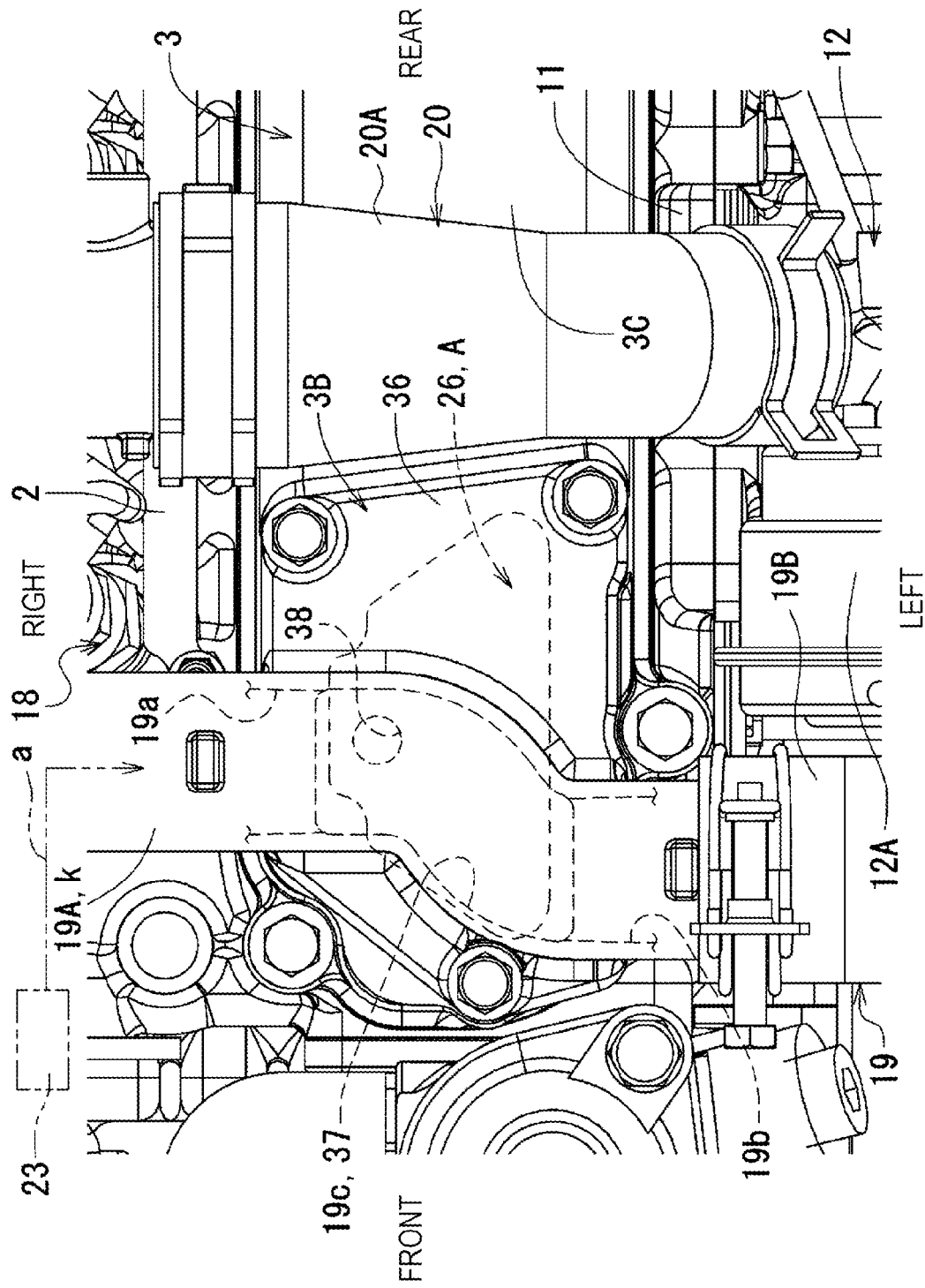
FIG. 6 is a plan view around a front portion of a head cover.
Figure 7:
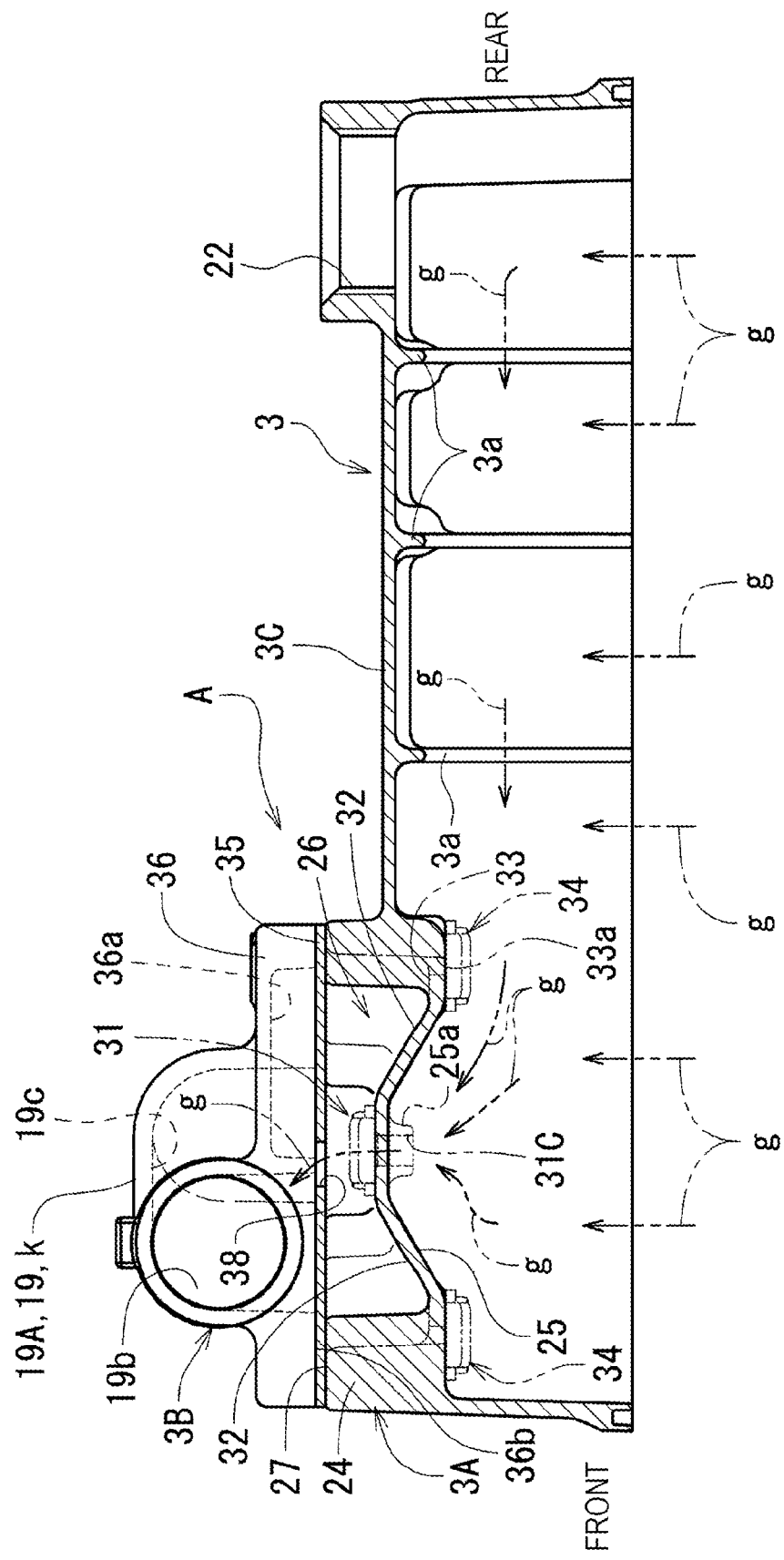
FIG. 7 is a partially-cutaway left side view of the head cover and a cover intake-passage.

A main function of the blow-by-gas returning system A (a portion that returns blow-by gas to the intake system k) will be briefly described. As illustrated in FIGS. 6 and 7, blow-by gas g that has flowed from the cylinder block 1 into an internal space within the head cover 3 flows through a discharge reed-valve (an example of a discharge check-valve) 31 to a space 26 that is the blow-by-gas passage of the blow-by-gas outlet 3A. Blow-by gas g that has entered the space 26 also called as a crankcase ventilation (CCV) chamber returns to the cover intake-passage 19A, that is, the intake system k, through a communication hole 38 of a gasket 35.

Next, the head cover 3 and the cover intake-passage 19A will be described in detail.

As illustrated in FIGS. 6 to 10, the head cover 3 has a rectangular shape that has round corners (an oval shape) in a plan view. A front end of a top wall 3C of the head cover 3 includes the blow-by-gas outlet 3A that is an opening that faces upward. The blow-by-gas outlet 3A is formed in the head cover 3 and has a shape like a box that has no lid. The blow-by-gas outlet 3A includes the space 26, and a joint surface 27 as a top surface. The space 26 is surrounded by a separating lateral wall 24 that vertically stands, and a bottom wall 25.

The space 26 as the blow-by-gas passage has a shape like a trapezoid that has a short side on a right side in a plan view. The bottom wall 25 includes a main bottom-surface 25A that is shallow, and flow bottom-surfaces 25B, 25B. The flow bottom-surfaces 25B, 25B are in front of and behind the main bottom-surface 25A, respectively, and each have a depth that varies in a front-to-rear direction. The main bottom-surface 25A has a shape like a letter "T" that faces sideways in a plan view. The discharge reed-valve 31 is fixed to the main bottom-surface 25A at a center of the main bottom-surface 25A in the front-to-rear direction. The discharge reed-valve 31 faces sideways (left). The discharge reed-valve 31 discharges blow-by gas g from within the head cover 3.

As illustrated in FIGS. 7 to 10, 12A and 12B, and 13A and 13B, the discharge reed-valve 31 includes a discharge-valve body 31A that is thin and is disposed on the main bottom-surface 25A, and a discharge-valve guide 31B that is thick. A base side of the discharge-valve body 31A and a base side of the discharge-valve guide 31B are bolted to the bottom wall 25. An end 31a of the discharge-valve body 31A has a circular shape. The end 31a is disposed on a top of a discharge-valve hole 31C, and usually functions as a lid for the discharge-valve hole 31C (a state in which the valve is closed). The discharge-valve hole 31C extends through the bottom wall 25 to the main bottom-surface 25A. The bottom wall 25 includes a protruding hole-wall 25a around the discharge-valve hole 31C. In a plan view, the protruding hole-wall 25a has a circular shape that is concentric with the discharge-valve hole 31C. The protruding hole-wall 25a protrudes downward. The main bottom-surface 25A functions as a valve seat 25A for the discharge reed-valve 31 and is in contact with the end 31a.

Figure 8:
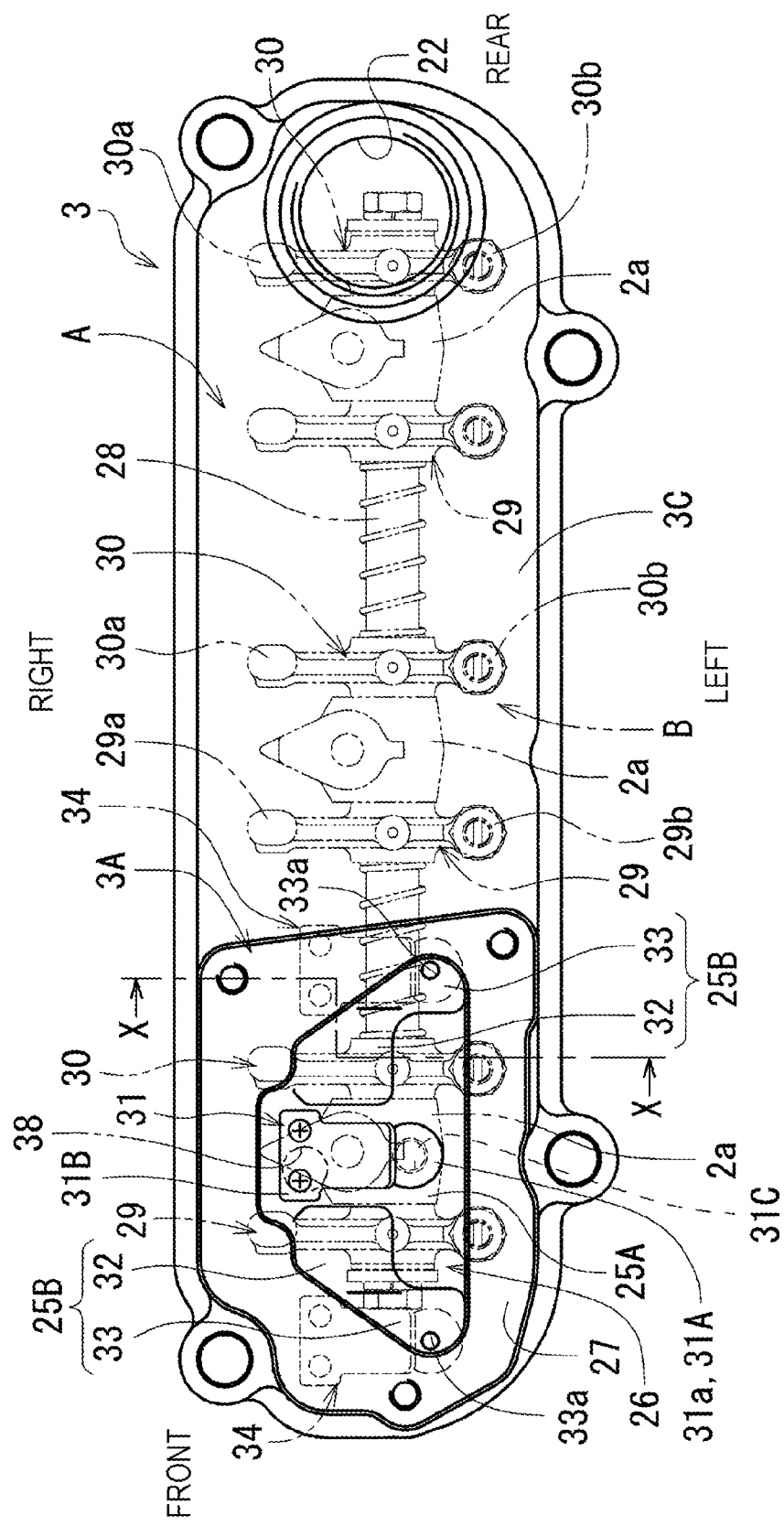
FIG. 8 is a plan view of the head cover.

One of the flow bottom-surfaces 25B includes a descending slope 32 that is in front of the discharge reed-valve 31 and descends forward, and a lowest surface 33 that is continuous with a low side of the descending slope 32 (see FIG. 8). The other flow bottom-surface 25B includes a descending slope 32 that is behind the discharge reed-valve 31 and descends rearward, and a lowest surface 33 that is continuous with a low side of the descending slope 32 (see FIG. 8). The lowest surfaces 33 are to a left of the respective descending slopes 32. Return-valve holes (examples of return holes) 33a vertically extend through the bottom wall 25 to the respective lowest surfaces 33, 33. Return reed-valves (examples of return check-valves) 34 for the respective return-valve holes 33a are disposed on the respective lowest surfaces 33, 33.

That is, the bottom wall 25 of the space 26 includes the return-valve holes 33a through which oil collected from blow-by gas g within the space 26 drops, and the descending slopes 32 that are around the respective return-valve holes 33a and become lower toward the respective return-valve holes 33a. The return-valve holes 33a extend to the respective lowest surfaces 33 that are lower than the main bottom-surface 25A.

As illustrated in FIGS. 7 to 10, 12A and 12B, and 13A and 13B, each return reed-valve 34 includes a return-valve body 34A that is brought into contact with a surface of the bottom wall 25 that is opposite the respective lowest surfaces 33, that is, a lowest back surface 33A, and a return-valve guide 34B that is thick. A base side of the return-valve body 34A and a base side of the return-valve guide 34B are bolted to the bottom wall 25. Disposition of the return reed-valves 34 is reverse disposition of the discharge reed-valve 31 upside down. Ends 34a of the return-valve bodies 34A usually lightly close the respective return-valve holes 33a. Alternatively, the ends 34a of the return-valve bodies 34A that slightly hang downward usually slightly open the respective return-valve holes 33a. The lowest back surfaces 33A function as valve seats 33A for the respective return reed-valves 34 and are brought into contact with the respective ends 34a.

Figure 9:
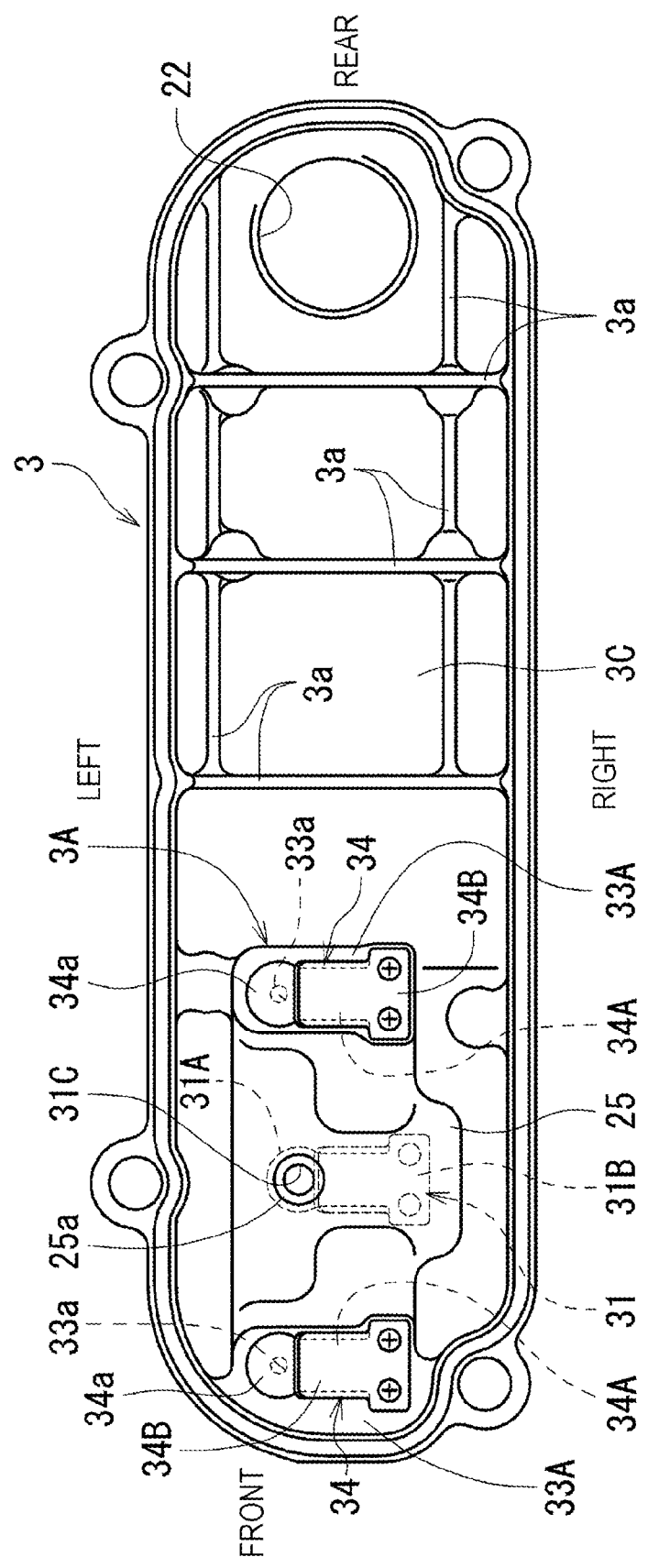
FIG. 9 is a bottom view of the head cover.
Figure 10:
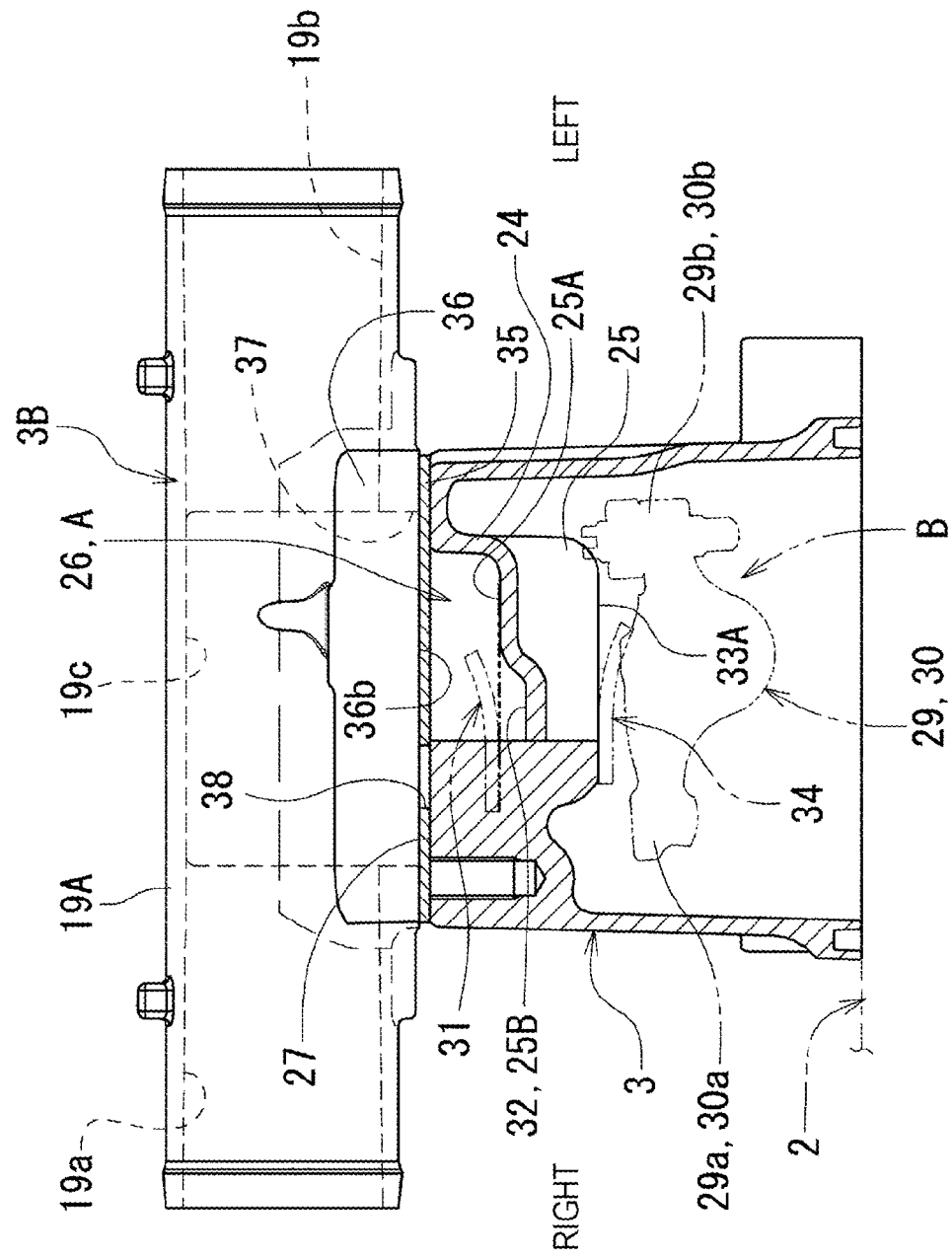
FIG. 10 is a partially-cutaway front view of the head cover and a portion taken along line X-X in FIG. 8.

The return reed-valves 34, 34 face sideways, and the ends 34a of the return-valve bodies 34A are on a left side. The return reed-valves 34, 34 act on the respective return-valve holes 33a that drop oil collected from, for example, oil mist contained in blow-by gas g within the space 26. Each return-valve hole 33a has a diameter that is smaller than a diameter of the discharge-valve hole 31C. It is convenient to use the same components for the discharge-valve body 31A and the return-valve bodies 34A, and the same components for the discharge-valve guide 31B and the return-valve guides 34B. However, different components may be used for the discharge-valve body 31A and the return-valve bodies 34A, and different components may be used for the discharge-valve guide 31B and the return-valve guides 34B. As illustrated in FIGS. 8 and 9, the pair of return reed-valves 34 align in the front-to-rear direction, and the discharge reed-valve 31 is between the pair of return reed-valves 34.

As illustrated in FIGS. 6 to 8, and 11A and 11B, a gas-outlet cover 3B is bolted to a top of the blow-by-gas outlet 3A. The gas-outlet cover 3B includes a cover lid 36 and the cover intake-passage 19A. The cover lid 36 has an outline similar to an outline of the blow-by-gas outlet 3A in a plan view. The cover lid 36 is fixed to the head cover 3 with three bolts. The gasket 35 is between the cover lid 36 and the head cover 3.

Figure 11A:
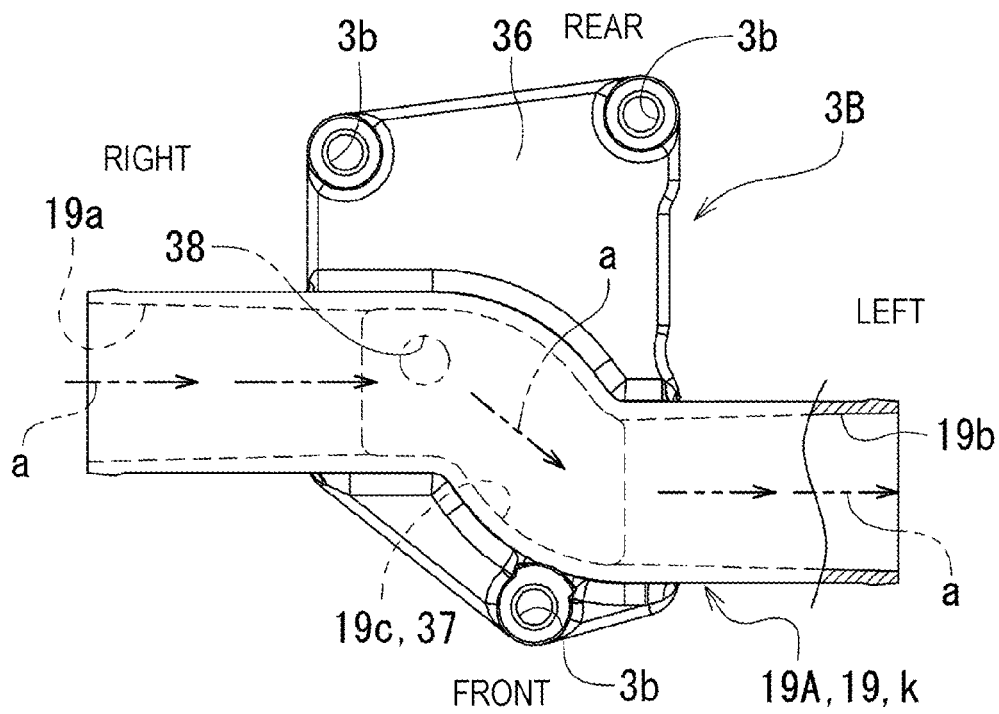
FIG. 11A is a plan view of a gas-outlet cover that shows the cover intake-passage.
Figure 11B:
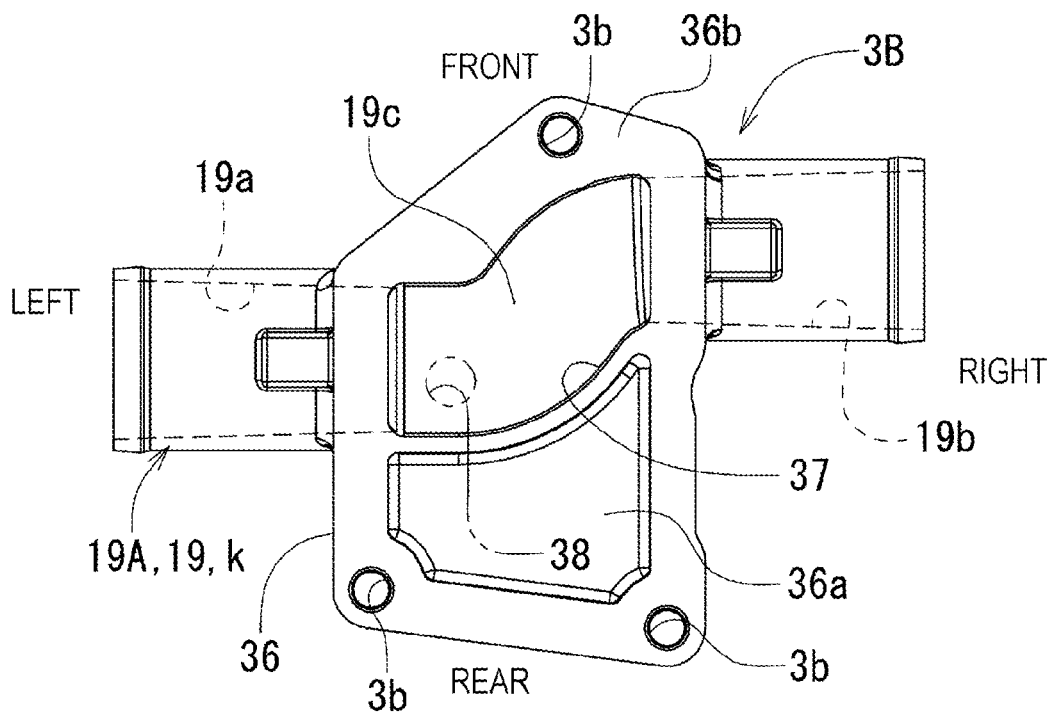
FIG. 11B is a bottom view of the gas-outlet cover that shows the cover intake-passage.

As illustrated in FIGS. 11A and 11B, the cover intake-passage 19A is curved in such a manner that a terminating passage 19b of the cover intake-passage 19A is nearer to an edge of the head cover 3 in a longitudinal direction of the head cover 3 than a leading passage 19a of the cover intake-passage 19A is. More specifically, the cover intake-passage 19A includes the leading passage 19a and the terminating passage 19b that are parallel to each other, and both extend in a direction that crosses over the longitudinal direction of the head cover (the front-to-rear direction) at a right angle (an example of crossing), and the intermediate passage 19c that connects a terminating end of the leading passage 19a with a leading end of the terminating passage 19b, and is oblique to the front-to-rear direction and oblique to a lateral direction. Consequently, the cover intake-passage 19A becomes a curved passage that has a shape like a crank (a shape substantially like a letter "Z") in a plan view.

The intermediate passage 19c is a groove-like passage that has a cross section like U that is upside down. An opening portion 37 that is a lower end of the intermediate passage 19c has a shape similar to a shape of the groove-like passage 19c in a plan view. The opening portion 37 faces downward. The cover lid 36 includes a hollow 36a behind the opening portion 37. The hollow 36a has an opening that faces downward. The cover lid 36 includes three bolt holes 3b. As illustrated in FIG. 11B, a lower end of the cover lid 36 forms a joint lower-surface 36b that has a shape generally like a letter "B".

Figure 14A:
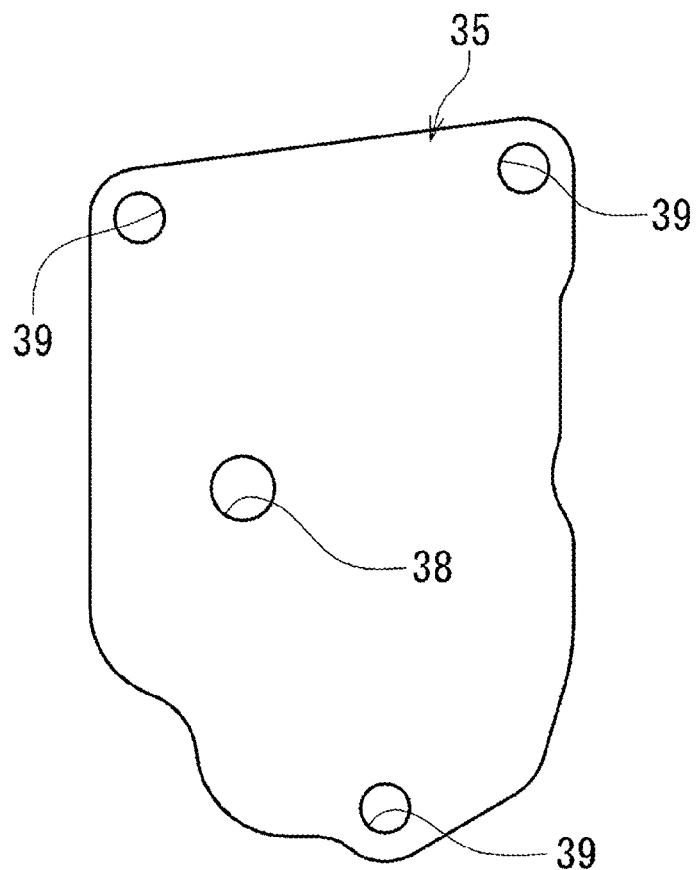
FIG. 14A is a plan view of a gasket.
Figure 14B:
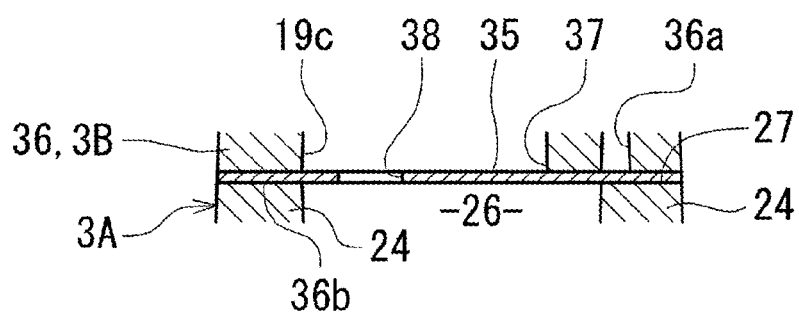
FIG. 14B is a cross-sectional view of the gasket and a part over the gasket and a part under the gasket.

As illustrated in FIG. 14A, the gasket 35 is a sheet that includes the one communication hole 38 and three bolt-insertion holes 39. As illustrated in FIG. 14B, the gasket 35 is held between the joint surface 27 that is a top surface of the blow-by-gas outlet 3A and the joint lower-surface 36b of the cover lid 36 (gas-outlet cover 3B). An outline of the joint surface 27 of the blow-by-gas outlet 3A, an outline of the gasket 35, and an outline of the cover lid 36 have the same shape.

As illustrated in FIG. 6, the space 26 of the blow-by-gas outlet 3A includes an upper opening that covers almost the entire opening portion 37 of the cover lid 36. Only the communication hole 38 of the gasket 35 connects the space 26 with the opening portion 37. That is, the communication hole 38 defines an area of communication between the intermediate passage 19c (opening portion 37) and the space 26, and defines a position that communicates with the intermediate passage 19c. The communication hole 38 also defines a position that communicates with the space 26. The communication hole 38 has a circular shape. Alternatively, the communication hole 38 may have various shapes, such as an oval shape or a quadrangular shape.

A valve actuator B will be briefly described. As illustrated in FIGS. 8, 10, and 12A and 12B, the valve actuator B includes a rocker-arm shaft 28, and a plurality of (six) rocker arms 29, 30. The rocker-arm shaft 28 extends in a front-to-rear direction, and is supported by a plurality of shaft supports 2a that stand on respective cylinder heads 2. The rocker arms 29, 30 are for intake and exhaust, and are swingably supported by the rocker-arm shaft 28.

The rocker arms 29, 30 include actuating ends 29a, 30a that actuate intake valves and exhaust valves (not shown), and actuated ends 29b, 30b actuated by respective pushrods (not shown). The cylinder head 2 includes pushrod holes (not shown). The pushrods extend through the respective pushrod holes. As illustrated in FIG. 8, blow-by gas g flows into the head cover 3 through the pushrod holes.

Figure 12A:
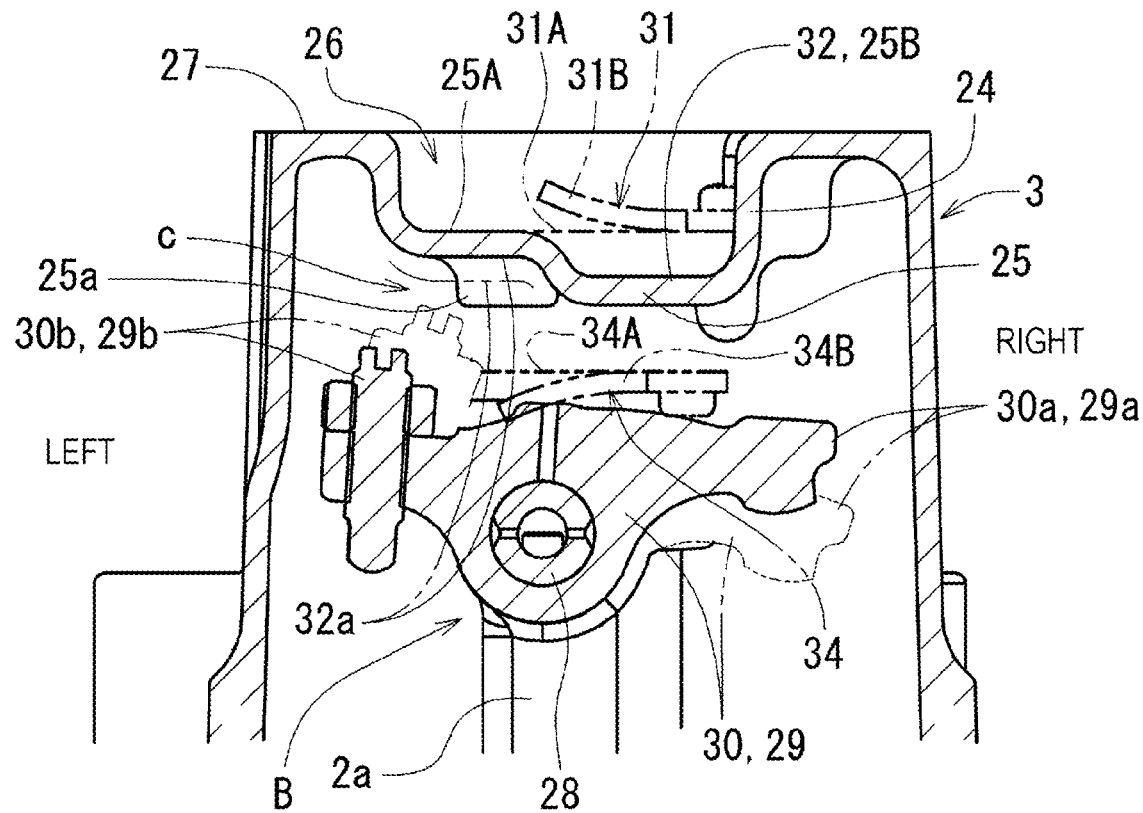
FIGS. 12A and 12B show relation between a blow-by-gas outlet and a valve actuator.
Figure 12B:
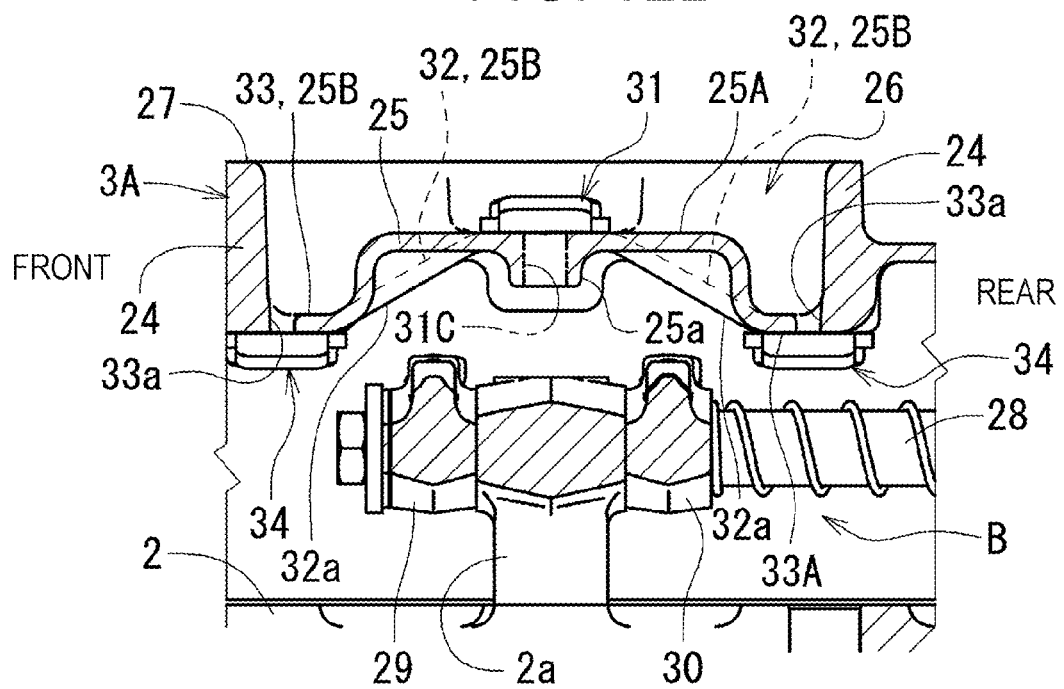
Figure 13A:
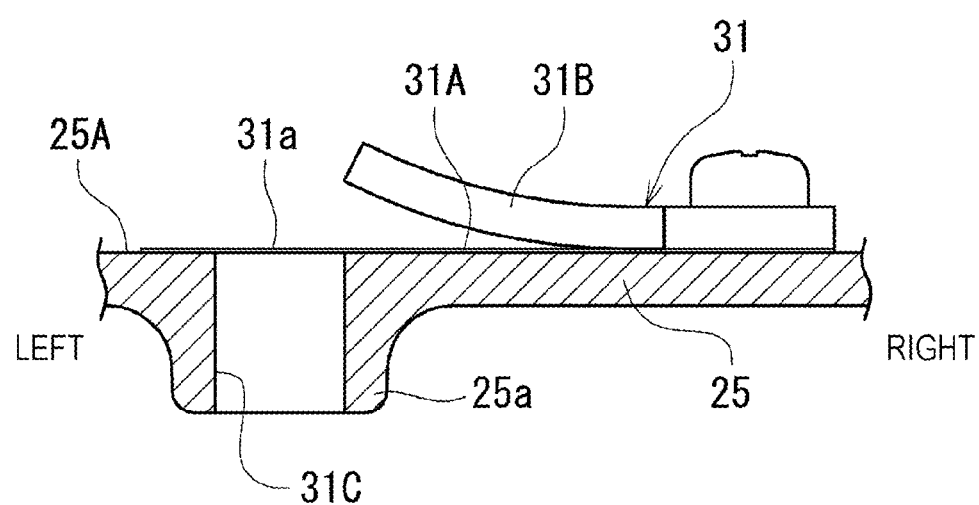
FIG. 13A is a side view of a discharge reed-valve.
Figure 13B:
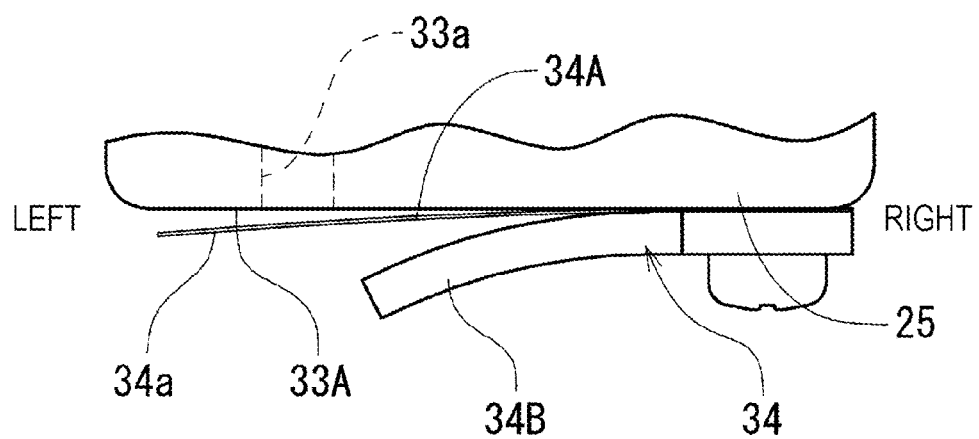
FIG. 13B is a side view of a return reed-valve.

As illustrated in FIG. 12B, a vertical distance between the valve actuator B and the bottom wall 25 is the shortest between a first-front rocker arm 29 and a slope back-surface 32*a* that is a back surface of one of the descending slopes 32, and is the shortest between a second-front rocker arm 30 and the other slope back-surface 32*a*. More specifically, as illustrated in FIG. 12A, the vertical distance is the shortest between an actuated end 29*b* of the first-front rocker arm 29 that moves highest and a corresponding one of the slope back-surfaces 32*a*, and is the shortest between an actuated end 30*b* of the second-front rocker arm 30 that moves highest and a corresponding one of the slope back-surfaces 32*a*. The shortest distance is set so that the shortest distance surely forms a sufficient gap, that is, a clearance c (3 mm, for example).

In the blow-by-gas returning system A, the bottom wall 25 that includes the discharge reed-valve 31 and the two return reed-valves 34, 34 separates an inside of the head cover 3 from the space 26. Further, the communication hole 38 of the gasket 35 connects the space 26 with the cover intake-passage 19A. Therefore, if an internal pressure within the head cover 3 is higher than a pressure of the cover intake-passage 19A, the discharge reed-valve 31 opens, and blow-by gas g within the head cover 3 flows into the intermediate passage 19*c* through the discharge reed-valve 31, the space 26, and the communication hole 38, and returns to the intake system k.

Alternatively, if an internal pressure within the head cover 3 is equal to or lower than a pressure of the cover intake-passage 19A, the pair of return reed-valves 34, 34 open. If the return reed-valves 34 open, oil (engine oil) collected from blow-by gas g within the space 26 drops into the head cover 3 through the return-valve holes 33*a*, 33*a* that align in the front-to-rear direction (drops under the bottom wall 25). Oil that drops through the return-valve holes 33*a* not only returns into the engine, but also is supplied to the valve actuator B, such as sliding portions (not shown) between the rocker-arm shaft 28 and the rocker arms 29, as illustrated in FIG. 12B. Therefore, a good lubricating function is also implemented.

In the engine that includes the blow-by-gas returning system according to an aspect of the present invention, the cover intake-passage 19A that forms part of the compressor upstream suction passage 19 is attached to the head cover 3, and the communication hole 38 of the gasket 35 connects the blow-by-gas passage 26 of the blow-by-gas outlet 3A with the intermediate passage 19*c* of the cover intake-passage 19A. The head cover 3 receives heat from the cylinder head 2 and thus becomes hot. Blow-by gas g returns to the cover intake-passage 19A that forms part of the head cover 3 that becomes hot.

Therefore, even if air a that has been sucked is cold due to very low temperatures, for example, a temperature of the air a rises while the air a flows through the cover intake-passage 19A (see FIG. 11A). Therefore, moisture in blow-by gas g that returns to the intermediate passage 19*c* does not freeze or is less likely to freeze. Consequently, moisture in blow-by gas g is less likely to freeze at a terminating end of the blow-by-gas passage 26 where the blow-by-gas passage 26 communicates with the intake system. Therefore, an improved engine that includes a blow-by-gas returning system that reduces inconvenience due to freezing at low temperatures as little as possible is provided.

As illustrated in FIGS. 6 and 11A and 11B, the cover intake-passage 19A is a curved passage that has a shape generally like a letter "Z" (a shape like a crank or a bent shape) in a plan view. Blow-by gas g returns to a place where the cover intake-passage 19A that is curved causes a larger change in flow of air a than a straight passage causes and activates the flow of air a, as illustrated in FIG. 11A. Therefore, the freezing protection described above is improved.

The terminating passage 19*b* is nearer to a front side (an edge of the head cover in a longitudinal direction of the head cover) than the leading passage 19*a* is. Therefore, the whole compressor upstream suction passage 19 that has a nonlinear shape and a simple structure is made by using the cover intake-passage 19A that is a molded product and is curved. A downstream side (terminating passage 19*b*) of the compressor upstream suction passage 19 that is a downstream side with respect to a joining position (communication hole 38) where blow-by gas g joins the compressor upstream suction passage 19 is nearer to a front side than the joining position is. Therefore, a cooling effect of cooling wind from the engine cooling fan 6 is higher at the terminating passage 19*b* than at the leading passage 19*a*. Therefore, a temperature of air supplied to the intake manifold 15 falls.

Since the descending slopes 32 are around the respective return-valve holes 33*a* and become lower toward the respective return-valve holes 33*a*, an effect that attracts collected oil to the return-valve holes 33*a* is improved. Further, even if an engine slightly tilts, the oil flows into the return-valve holes 33*a*.

Since the return reed-valves 34 are provided for the respective return-valve holes 33*a*, blow-by gas g is not allowed to flow into the space 26 through the return-valve holes 33*a* while collected oil is allowed to drop.

Since the valve actuator B is disposed under the return-valve holes 33*a*, oil that drops through the return-valve holes 33*a* also lubricates, for example, sliding portions between the rocker arms 29 and the rocker-arm shaft 28.

The return reed-valves 34, 34 are disposed in front of and behind the discharge reed-valve 31, respectively. Therefore, even if the engine tilts forward or rearward, oil smoothly flows into one of the return-valve holes 33*a*.

Other Preferred Embodiments

The gas-outlet cover 3B that includes the cover intake-passage 19A may be integral with the head cover 3. In this case, a structure that corresponds to the bottom wall 25 (a partition, for example) may be used to form the space, that is, the blow-by-gas passage 26.

The cover intake-passage 19A may be variously curved, and have a shape like a letter "S", a letter "W", a letter "Ω", or a spiral. The cover intake-passage 19A may be straight.

The cover intake-passage 19A may be a suction passage that connects the air cleaner with the intake manifold (naturally aspirated engine).

Figure 15:
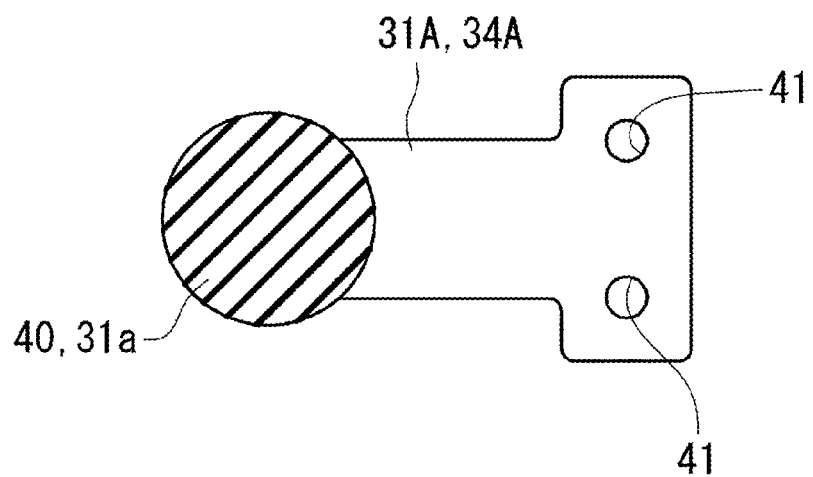
FIG. 15 is a bottom view of a valve body that includes an end coated with rubber.

The ends 34*a* of the return-valve bodies 34A of the return reed-valves 34 have surfaces that are brought into contact with the respective valve seats 33A. As illustrated in FIG. 15, the surfaces may each be coated with a thin film made from rubber (an example of elastic materials) 40, that is, a rubber sheet (rubber film) 40. Consequently, air tightness between the valve seats 33A and the ends 34*a* when the valves are closed is improved. Two portions designated as 41 are bolt-insertion holes.

The end 31*a* of the discharge-valve body 31A of the discharge reed-valve 31 has a surface that is in contact with the valve seat 25A. The surface may also be coated with a rubber sheet 40. The valve seats 33A, 25A instead of the ends 34a, 31a may be coated with rubber sheets 40. For example, the elastic material 40 may be a flexible synthetic resin, instead of rubber.

The return check-valves 34 and the discharge check-valve 31 may be valves that have structures that are different from a structure of a reed valve, such as an umbrella valve. Instead of the descending slopes that descend forward or rearward, the descending slopes 32 may descend left or right, or descend in two or more directions of a forward direction, a rearward direction, left, and right.

What is claimed is:

1. An engine that includes a blow-by-gas returning system, the engine being configured to direct blow-by gas within a crankcase to an intake system through an inside of a head cover,
   wherein the intake system includes a cover intake-passage disposed at the head cover, and the cover intake-passage communicates with a blow-by-gas passage of the head cover,
   wherein the cover intake-passage forms part of a suction passage that connects an air cleaner with a supercharger, and the cover intake-passage is integral with the head cover, and
   wherein the blow-by-gas passage communicates with the cover intake-passage through a communication hole of a gasket, the gasket being held between the blow-by-gas passage and the cover intake-passage.

2. The engine that includes the blow-by-gas returning system according to claim 1, wherein the cover intake-passage is a curved passage.

3. The engine that includes the blow-by-gas returning system according to claim 2, wherein a terminating passage of the cover intake-passage is nearer to an edge of the head cover in a longitudinal direction of the head cover than a leading passage of the cover intake-passage is.

4. The engine that includes the blow-by-gas returning system according to claim 3, wherein the cover intake-passage includes the leading passage and the terminating passage that are parallel to each other, and both extend in a direction that crosses over the longitudinal direction of the head cover, and an intermediate passage that connects a terminating end of the leading passage with a leading end of the terminating passage.

5. An engine that includes a blow-by-gas returning system, the engine being configured to direct blow-by gas within a crankcase to an intake system through an inside of a head cover,
   wherein the intake system includes a cover intake-passage disposed at the head cover, and the cover intake-passage communicates with a blow-by-gas passage of the head cover,
   the cover intake-passage forms part of a suction passage that connects an air cleaner with a supercharger, and the cover intake-passage is integral with the head cover,
   a bottom wall of the blow-by-gas passage includes a return hole through which oil collected within the blow-by-gas passage drops,
   the bottom wall includes a descending slope that is around the return hole and becomes lower toward the return hole, and
   the blow-by-gas passage communicates with the cover intake-passage through a communication hole of a gasket, the gasket being held between the blow-by-gas passage and the cover intake-passage.

6. The engine that includes the blow-by-gas returning system according to claim 5, the engine further comprising a return check-valve that allows oil to drop through the return hole, and does not allow reverse flow from the return hole to the blow-by-gas passage.

7. The engine that includes the blow-by-gas returning system according to claim 6, wherein a valve actuator is disposed under the return hole.

8. The engine that includes the blow-by-gas returning system according to claim 7, wherein the return check-valve is a reed valve, and a valve seat of the reed valve is coated with an elastic material, or a valve-body end that is part of a valve body and is to be brought into contact with the valve seat is coated with the elastic material.

9. The engine that includes the blow-by-gas returning system according to claim 6, wherein the return check-valve is a reed valve, and a valve seat of the reed valve is coated with an elastic material, or a valve-body end that is part of a valve body and is to be brought into contact with the valve seat is coated with the elastic material.

10. The engine that includes the blow-by-gas returning system according to claim 6, wherein the cover intake-passage is disposed at a blow-by-gas outlet of the head cover, and
    the bottom wall is a bottom wall of the blow-by-gas outlet.

11. The engine that includes the blow-by-gas returning system according to claim 10, wherein a discharge check-valve is disposed on the bottom wall, the discharge check-valve allows blow-by gas to flow into the blow-by-gas outlet and does not allow blow-by gas to flow from the blow-by-gas outlet, and
    the discharge check-valve is between a pair of the return check-valves.

12. The engine that includes the blow-by-gas returning system according to claim 5, wherein a valve actuator is disposed under the return hole.

13. The engine that includes the blow-by-gas returning system according to claim 12, wherein the return check-valve is a reed valve, and a valve seat of the reed valve is coated with an elastic material, or a valve-body end that is part of a valve body and is to be brought into contact with the valve seat is coated with the elastic material.

14. The engine that includes the blow-by-gas returning system according to claim 5, wherein the return check-valve is a reed valve, and a valve seat of the reed valve is coated with an elastic material, or a valve-body end that is part of a valve body and is to be brought into contact with the valve seat is coated with the elastic material.
2020.

15. The engine that includes the blow-by-gas returning system according to claim 5, wherein the cover intake-passage is disposed at a blow-by-gas outlet of the head cover, and
    the bottom wall is a bottom wall of the blow-by-gas outlet.

16. The engine that includes the blow-by-gas returning system according to claim 15, wherein a discharge check-valve is disposed on the bottom wall, the discharge check-valve allows blow-by gas to flow into the blow-by-gas outlet and does not allow blow-by gas to flow from the blow-by-gas outlet, and
    the discharge check-valve is between a pair of the return check-valves.

* * * * *